United States Patent
Martin Regalado et al.

(10) Patent No.: US 11,714,245 B2
(45) Date of Patent: Aug. 1, 2023

(54) MULTISENSING OPTICAL FIBER CABLE

(71) Applicant: Prysmian S.p.A., Milan (IT)

(72) Inventors: Josep Maria Martin Regalado, Barcelona (ES); Ester Castillo Lopez, Barcelona (ES); Veronica Iglesias Rodriguez, Barcelona (ES)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 17/565,631

(22) Filed: Dec. 30, 2021

(65) Prior Publication Data

US 2022/0206238 A1 Jun. 30, 2022

(30) Foreign Application Priority Data

Dec. 31, 2020 (EP) .................................... 20383182

(51) Int. Cl.
*G02B 6/44* (2006.01)
*G01H 9/00* (2006.01)
*G01L 1/24* (2006.01)

(52) U.S. Cl.
CPC .......... *G02B 6/4435* (2013.01); *G01H 9/004* (2013.01); *G01L 1/242* (2013.01); *G02B 6/4488* (2013.01)

(58) Field of Classification Search
CPC .... G02B 6/4435; G02B 6/4488; G02B 6/441; G02B 6/4415; G02B 6/4432; G02B 6/4427; G01H 9/004; G01L 1/242; G01D 5/3538

See application file for complete search history.

(56) References Cited

U.S. PATENT DOCUMENTS

| | | | | |
|---|---|---|---|---|
| 5,905,834 A | * | 5/1999 | Anderson | G02B 6/441 385/113 |
| 10,784,023 B2 | * | 9/2020 | Herbst | G02B 6/443 |
| 10,795,109 B2 | * | 10/2020 | Benjamin | E21B 19/008 |
| 2004/0258373 A1 | * | 12/2004 | Andreassen | G01D 5/35303 385/100 |
| 2016/0222736 A1 | | 8/2016 | Varkey et al. | |

FOREIGN PATENT DOCUMENTS

| CN | 201765352 U | 3/2011 |
|---|---|---|
| CN | 207424326 U | 5/2018 |
| CN | 111678762 A | 9/2020 |

(Continued)

OTHER PUBLICATIONS

EN ISO 37, "Rubber, vulcanized or thermoplastic—Determination of tensile stress-strain properties," (ISO 37:2017(E), Nov. 2017, 36 pages.

(Continued)

*Primary Examiner* — John Bedtelyon
(74) *Attorney, Agent, or Firm* — Slater Matsil, LLP

(57) ABSTRACT

Disclosed is an optical cable for distributed sensing. The optical cable comprises a first metal tube with at least two optical fibers loosely arranged therein and a second metal tube with at least two tight buffered optical fibers tightly arranged within an inner surface of the second metal tube. A third metal tube having an inner surface collectively surrounds and operatively contacts the first metal tube and said second metal tube. At least one of the first metal tube and the second metal tube is fixed by means of an adhesive compound to the inner surface of the third metal tube.

20 Claims, 1 Drawing Sheet

(56) References Cited

FOREIGN PATENT DOCUMENTS

| EP | 0744638 A2 | 11/1996 |
|---|---|---|
| EP | 0744638 A3 | 11/1996 |
| EP | 3044403 A1 | 7/2016 |

OTHER PUBLICATIONS

EN ISO 527-2, "Plastics Determination of tensile properties, Part 2: Test conditions for moulding and extrusion plastics," (ISO 527-2: 1993, including Corr 1: 1994), European Standard Norme Europeenne Europaische Norm, May 1996, 8 pages.
ITU-T, G.651.1, Series G: Transmission Systems and Media, Digital Systems and Networks, Transmission media and optical systems characteristics—Optical fibre cables, "Characteristics of a 50/125 μm multimode graded index optical fibre cable for the optical access network," ITU-T Recommendation, Jul. 2007, 15 pages.
ITU-T, G.652, Series G: Transmission Systems and Media, Digital Systems and Networks, Transmission media and optical systems characteristics-Optical fibre cables, "Characteristics of a single-mode optical fibre and cable," ITU-T Recommendation, Nov. 2009, 22 pages.
ITU-T, G.657, Series G: Transmission Systems and Media, Digital Systems and Networks, Transmission media and optical systems characteristics-Optical fibre cables, "Characteristics of a bending-loss insensitive single-mode optical fibre and cable for the access network," ITU-T Recommendation, Nov. 2009, 22 pages.
Fiber Options, Inc., "Learning about options in Fiber, An Introduction Fiber-Optic Basics, Table and Terms Applications," Rev 10, 1994, 53 pages.

\* cited by examiner

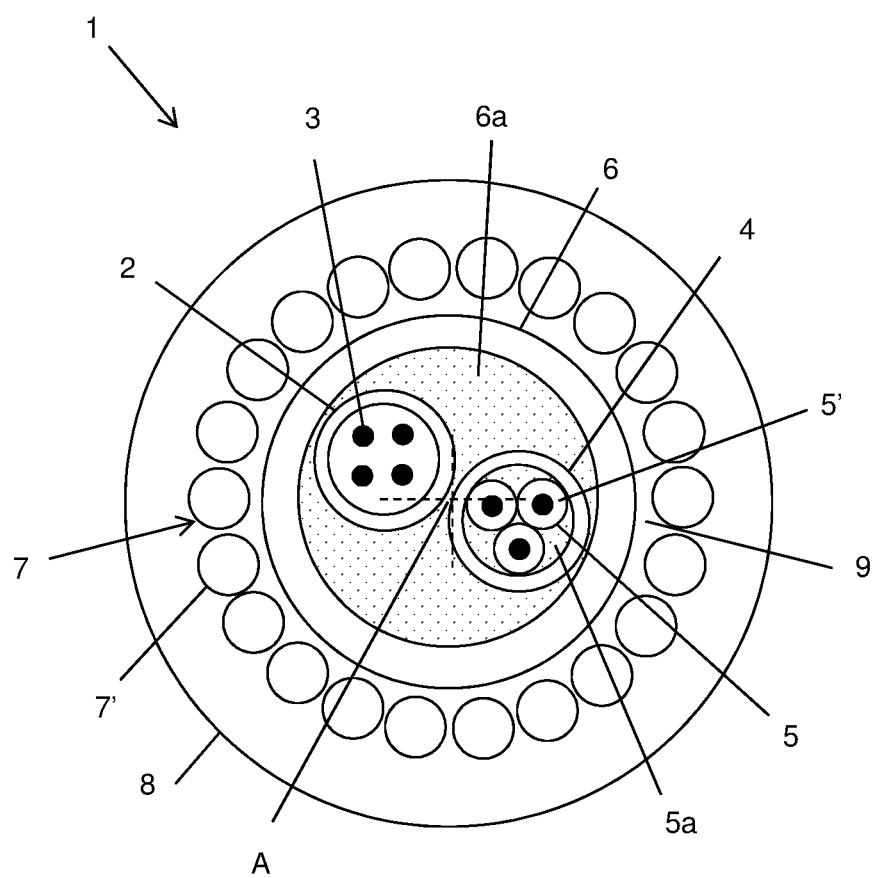

MULTISENSING OPTICAL FIBER CABLE

CROSS-REFERENCE TO RELATED APPLICATIONS

This application claims priority to European Application No. 20383182.1, filed on Dec. 31, 2020, which application is hereby incorporated herein by reference.

TECHNICAL FIELD

The present disclosure relates to the field of multisensing optical fiber cables for distributed sensing. In particular, the present disclosure relates to a multisensing optical fiber cable suitable for underground, underwater and/or submarine applications.

BACKGROUND

As known, distributed sensing, such as Distributed Temperature Sensing (DTS), Distributed Strain Sensing (DSS) and Distributed Acoustic Sensing (DAS), is a technology that enables continuous, real-time measurements along the entire length of a fiber optic cable by exploiting physical phenomena occurring in optical fibers (e.g. Raman scattering, Rayleigh scattering or Brillouin scattering) to provide a distributed sensing of temperature, vibration (for acoustic sensing) or strain. A distributed sensing system generally comprises a cable containing one or more optical fibers suitable for distributed sensing, and one or more apparatus for reading, recording and/or processing the above-mentioned physical phenomena.

Distributed sensing is more and more demanded in different applications, such as the monitoring of O&G (Oil and Gas) or water pipelines or civil works (monitoring of bridges, tunnel or ground movements).

Cables containing one or more optical fibers suitable for distributed sensing can also contain optical fibers for optical communications.

As known, an optical cable typically comprises an optical core including one or more optical fibers, and one or more layers surrounding and protecting the optical core.

The optical fibers may be arranged in various ways within the optical core of a cable. In particular, one or more optical fibers (possibly grouped in different bundles) may be loosely arranged within a semi-rigid loose tube. Alternatively, each optical fiber may be tight buffered in a respective sleeve of buffering material. While both the loose arrangement and the tight buffered arrangement may be suitable for communication applications, depending on the environment for which the optical cable is intended (outdoor, indoor, underwater, etc.), distributed sensing requires a specific arrangement of the optical fibers. In particular, while DTS sensing requires optical fibers with a loose arrangement, for DSS and DAS sensing tight-buffered optical fibers can be preferred, since this allows making them mechanically congruent with the cable structure and then provide a higher sensing accuracy.

Optical cables for distributed sensing are known.

CN 201765352 discloses an optical cable for measuring seawater temperature along the depth direction. The cable comprises from 2 to 4 temperature sensing fibers coated with a coated stainless steel sleeve; 2 pressure sensing fibers coated with a polyurethane layer and then an outer spring tube and a stainless steel mesh. The sensing fibers are twisted, then covered by a double stainless steel hose. The cable has an outer diameter of 10-12 mm.

CN 207424326 discloses a sensor communication composite optical cable with a core comprising communication optical fibers at the centre, and a plurality of sensing tight-buffered optical fibers uniformly intertwined on the periphery of the communication optical fibers. The tube containing the communication optical fibers is made of stainless steel. The tight-buffered optical fibers are coated with a reinforced layer preferably made of aramid. The jacket comprises a tape coated by a glass layer, coated by a plastic-coated steel belt, coated by the outer jacket.

SUMMARY

The Applicant has perceived the need to provide an optical cable, in particular an optical cable for underground, underwater and/or submarine applications, which can combine all possible types of distributed sensing (DTS, DSS and DAS) and optical communications capabilities with a reduced cable size and a reduced cable weight.

Protection against water seepage can be required, which is typically achieved by providing hermetically sealed metal tubes around the optical fibers, while in the case of optical cables for underwater and submarine applications a metal armor made of one or more layer of steel wires and an outer sheath made of hard polymer material (e.g. High Density Polyethylene, HDPE) can be provided in order to withstand high pressures (up to 300 bar) typical of underwater and submarine environments. The presence of such cable structures results in cables with large outer diameter and high weight, which can be critical, especially in the context of underwater and submarine applications.

In addition, providing different types of distributed sensing (DTS, DSS and DAS) and optical communications capabilities in a same cable requires providing in the same cable optical fibers with different arrangements and operational requirements, which could increase the cable size.

The known cables for distributed sensing described above exhibit some drawbacks in this respect.

In particular, the above-mentioned cable of CN 201765352 exhibits a large outer diameter (10-12 mm) in comparison with the limited fiber count (4+2) contained therein. This is mainly due to the fact that each tight-buffered optical fiber is individually tightly buffered in a respective steel layer, whose outer diameter—in order to guarantee that the tight-buffered optical fibers are mechanically congruent with the cable structure, as required for DSS and DAS sensing—shall match the outer diameter of the steel sleeve accommodating the loose fibers. The diameter of the steel sleeve is tailored to allow accommodation of all the loose fibers together, but it clearly results in an excessive buffer thickness for the tight buffered fibers. Further, if one wishes to increase the fiber count by providing e.g. further loose fibers for DTS or optical communications, the diameter of all the steel layers shall be consistently increased, thereby resulting in a substantial further increase of the outer diameter of the cable.

The Applicant has then faced the problem of providing an optical cable for distributed sensing, which overcomes the aforesaid drawbacks.

In particular, the Applicant has tackled the problem of providing an optical cable for distributed sensing system, especially suitable for underground, underwater and/or submarine applications, wherein all the optical fibers are adequately protected against water seepage and, when needed, the high pressures (up to 300 bar) typical of underwater and submarine environments, wherein the tight buffered fibers are mechanically congruent with the cable structure (as required for DAS and/or DSS sensing) and wherein the cable size and weight are reduced.

According to embodiments of the present disclosure, the above problem is solved by an optical cable for distributed sensing, which comprises a first metal tube loosely accommodating at least two optical fibers and a second metal tube tightly accommodating at least two tight-buffered optical fibers. The cable also comprises a third metal tube collectively surrounding and operatively contacting the first and second metal tubes. At least one of the optical fiber accommodating metal tubes is fixed by means of an adhesive compound to the inner surface of the third metal tube.

Using a single metal tube to collectively enclose all the tight buffered fibers allows protecting them against water seepage while keeping the cable size smaller than e.g. that of a cable wherein multiple steel tubes are used for singularly protecting each tight-buffered optical fiber. Further, the third metal tube collectively surrounding both the first and second metal tubes also allows effectively protecting all the optical fibers of the cable against the high pressures (up to 300 bar) typical of underwater and submarine environments, e.g. by providing an armor and a thick jacket as outer sheath made of hard polymer material (e.g. HDPE) externally to the third metal tube.

Further, the tight accommodation of the tight-buffered optical fibers within the second metal tube, in combination with the adhesive compound fixing at least one of the optical fiber accommodating metal tubes to the inner surface of the third metal tube, guarantees that the tight buffered fibers are mechanically congruent with the cable structure. This provides a cable with a high sensing accuracy, in particular as far as DAS and DSS sensing is concerned.

Therefore, according to a first aspect, the present disclosure provides an optical cable for distributed sensing comprising: a first metal tube with at least two optical fibers loosely arranged therein; a second metal tube with at least two tight buffered optical fibers tightly arranged within an inner surface of the second metal tube; and a third metal tube having an inner surface, collectively surrounding and operatively contacting the first metal tube and the second metal tube, wherein at least one of the first and second metal tube is fixed to the inner surface of the third metal tube by means of an adhesive compound.

In an embodiment, the first metal tube and second metal tube are made of stainless steel.

In an embodiment, the third metal tube is made of stainless steel.

In an embodiment, the adhesive compound fills the interstices among the first and second metal tubes and the inner surface of the third tube.

In an embodiment, the adhesive compound can be selected from a holt melt adhesive, an epoxy adhesive, a silicone adhesive, and mixtures thereof.

In an embodiment, the adhesive compound, once hardened, has a tensile strength ranging from 1 to 10 N/mm2 as measured according to ISO 37 (2017-11) for silicone or according to ISO 527-2 (1996) for hot melt and epoxy adhesive.

In an embodiment, an inner adhesive compound substantially fills voids and interstices between the tight buffered optical fibers and the inner surface of the second tube.

In an embodiment, the first metal tube and second metal tube can be laid within the third tube substantially parallel to a longitudinal axis of the optical cable, or stranded one to the other.

In an embodiment, the optical cable comprises an armor in radially outer position with respect to the third metal tube.

The armor can be made of at least one layer of wires. Alternatively, the armor can be made of a corrugated, optionally interlocked tape helically wound around the third metal tube.

When the optical cable of the present disclosure comprises an armor in radially outer position with respect to the third metal tube, the optical cable can further comprise a bedding layer interposed between the third metal tube and in direct contact thereto and the armor.

In an embodiment, the optical cable comprises a jacket in radially outer position with respect to the third metal tube and, if any, to the armor. When present, the jacket is the outermost layer of the cable of the disclosure.

In an embodiment, the optical fibers loosely arranged in the first metal tube are capable of distributed temperature sensing (DTS) and of transmitting data.

In an embodiment, the at least two tight buffered optical fibers are capable of distributed strain sensing (DSS) and distributed acoustic sensing (DAS).

According to a second aspect, the present disclosure relates to a process for manufacturing an optical cable for distributed sensing, said process comprising the step of: providing a first metal tube with at least two optical fibers loosely arranged therein;

providing a second metal tube with at least two tight buffered optical fibers tightly arranged therein; applying an adhesive compound on at least one of said first metal tube and said second metal tube; joining the first metal tube and second metal tube to a metal foil; conforming the metal foil around the first metal tube and second metal tube; and welding the metal foil to provide a third metal tube collectively surrounding and operatively contacting the first metal tube and the second metal tube.

In an embodiment, at step iii the adhesive compound is applied on one of the first metal tube or second metal tube, only.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

The present disclosure, in at least one of the aforementioned aspects, can be implemented according to one or more of the following embodiments, optionally combined together.

For the purpose of the present description and of the appended claims, the words "a" or "an" should be read to include one or at least one and the singular also includes the plural unless it is obvious that it is meant otherwise. This is done merely for convenience and to give a general sense of the disclosure.

BRIEF DESCRIPTION OF THE DRAWINGS

The present disclosure will be further clarified by the following detailed description, given by way of example and not of limitation, with reference to the attached drawing wherein:

FIG. 1 schematically shows an optical cable according to an embodiment of the present disclosure.

DETAILED DESCRIPTION OF ILLUSTRATIVE EMBODIMENTS

FIG. 1 shows an optical cable 1 according to an embodiment of the present disclosure. The optical cable 1 can be suitable for underwater applications or submarine applications.

The optical cable 1 comprises a first tube 2 wherein at least two optical fibers 3 are loosely arranged. The first tube 2 is also termed herein after as "loose tube."

The loose tube 2 is made of a metal, for example stainless steel or copper. In an embodiment, the loose tube 2 is a hermetically sealed tube, for example a welded tube. The loose tube 2 can have an outer diameter comprised between 0.9 mm and 3.5 mm. The loose tube 2 can have a thickness comprised between 0.1 mm and 0.3 mm.

Optionally, the loose tube 2 may also contain a lubricating gel for reducing frictions amongst the optical fibers 3.

The optical fibers 3 can be suitable for distributed temperature sensing and/or optical communications. For example, the optical fibers 3 may be multimode optical fibers compliant with ITU-T Recommendation G.651.1 (07/2007) or single mode optical fibers compliant with ITU-T Recommendation G.652 (11/2009) or G.657 (11/2009) with an outer diameter of 260 microns. The fiber count of optical fibers 3 within the loose tube 2 may range, for example, from 2 to 12. By way of non limiting example, the fiber count of the optical fibers 3 in the cable 1 depicted in FIG. 1 is 4.

The optical cable 1 also comprises a second tube 4 wherein at least two tight-buffered optical fibers 5 are tightly arranged. The second tube 4 is also termed herein after as "tight buffer tube."

The tight buffer tube 4 is made of a metal, for example stainless steel or copper. In an embodiment, the tight buffer tube 4 is a hermetically sealed tube, for example a welded tube. In an embodiment, the tight buffer tube 4 has a diameter substantially equal to the diameter of the loose tube 2. The tight buffer tube 4 can have an outer diameter comprised between 0.9 mm and 3.5 mm. The loose tube 2 can have a thickness comprised between 0.1 mm and 0.3 mm.

The tight buffered optical fibers 5 can be suitable for strain sensing and/or acoustic sensing. For example, the optical fibers 5 may be multimode optical fibers compliant with ITU-T Recommendation G. 651.1 (07/2007) or single mode optical fibers compliant with ITU-T Recommendation G.652 or G.657 (11/2009). For example, the fiber count of optical fibers 5 within the tight buffer tube 4 may be equal to 3.

Each optical fiber of the present disclosure comprises a core, a cladding and at least one polymeric coating, for example an acrylate coating. In the case of the tight buffered optical fibers 5, each optical fiber further comprises a buffer layer 5' of polymer material (for example, polyamide or a polyethylene copolymer, optionally charged with a zero halogen flame retardant filler) in direct contact with the surface of the polymeric coating of the fiber. The outer diameter of the tight buffered optical fiber 5 (comprehensive of its buffer layer 5') can be comprised between 500 microns and 1000 microns.

In an embodiment, an inner adhesive compound 5a fills the voids between the tight buffered fibers 5 and the inner surface of the tight buffer tube 4. This could improve the mechanical congruency of the tight buffered fibers 5 to the tight buffer tube 4 and, then, to the whole cable structure. The inner adhesive compound 5a may comprise for example a holt melt adhesive (e.g. a polyethylene polymer, for example a low density one), an epoxy adhesive or a silicone adhesive.

The optical cable 1 also comprises a third tube 6 collectively surrounding the loose tube 2 and the tight buffer tube 4, and operatively contacting both of them. The third tube 6 is also termed herein after as "outer tube".

The outer tube 6 is also made of metal, for example stainless steel. Examples of steel suitable for the present cable is a SAE 304, 316, 316L grade. Alternatively, copper may be used. In an embodiment, the outer tube 6 is a hermetically sealed tube, for example a welded tube. The thickness of the outer tube 6 can be comprised between 0.1 mm and 0.3 mm.

The inner diameter of the outer tube 6 can be substantially equal to the sum of the outer diameters of the loose tube 2 and the tight buffer tube 4. This way, the inner surface of the outer tube 6 contacts both the loose tube 2 and the tight buffer tube 4, so that the tubes 2, 4 are tightly accommodated within the outer tube 6. Hence, taking into account the above disclosed thickness range (0.2 mm-0.4 mm), the outer diameter of the outer tube 6 can be comprised between 3.6 mm and 4.0 mm.

An adhesive compound 6a fixes at least one of the loose tube 2 and the tight buffer tube 4 to the inner surface of the outer tube 6. In an embodiment, the adhesive compound 6a substantially fills the interstices among the tubes 2 and/or 4 and the inner surface of the outer tube 6. This could further improve the mechanical congruency of the tight buffered fibers 5 to the whole cable structure. The adhesive compound 6a may be the same or different from the inner adhesive compound and may comprise for example a holt melt adhesive, an epoxy adhesive or a silicone adhesive.

In an embodiment, the adhesive compound is a hot melt adhesive, e.g. a polyethylene polymer, for example a low density one. The polyethylene adhesive compound, once hardened, can have a tensile strength ranging from 3 to 10 N/mm2 as measured according to ISO 527-2 (1996).

In another embodiment, the adhesive compound is a silicone adhesive. The silicone adhesive, once hardened, can have a tensile strength ranging from 1 to 4 N/mm2 as measured according to ISO 37 (2017-11). In an embodiment, the silicone adhesive is a room temperature vulcanizing adhesive.

In an embodiment, the loose tube 2 with the loose optical fibers 3 arranged therein and the tight buffer tube 4 with the tight buffered optical fibers 5 arranged therein are laid within the outer tube 6 substantially parallel to the longitudinal axis A of the optical cable 1. In another embodiment, the loose tube 2 with the loose optical fibers 3 arranged therein and the tight buffer tube 4 with the tight buffered optical fibers 5 arranged therein are laid within the outer tube 6 stranded one with the other.

In the embodiment of FIG. 1, an armor 7 is provided around the outer tube 6. The armor 7 comprises a plurality of wires 7' helically wound around the outer surface of the outer tube 6. The wires 7' in particular may be wound in close helix on the outer surface of the outer tube 6.

The wires 7' of the armor 7 can be of metal, for example steel wires optionally galvanized (GS), stainless and/or aluminum cladded. In a further embodiment, the wires 7' can be made of aramid fibers, GRP (glass reinforced plastic) or glass yarns. An armor 7 made of metallic and non-metallic wires 7' can be also envisaged.

Each armor wire may have a diameter comprised between 0.5 mm and 3.6 mm. The wires may have a low tensile strength (≤45 kg/mm2), a medium tensile strength (≤100 kg/mm2) or a high tensile strength (≤200 kg/mm2).

In the optical cable 1 according to the first embodiment depicted in FIG. 1, the wires 7' of the armor 7 are arranged in a single circumferential layer substantially concentric with the outer tube 6. Alternatively, the armor 7 may comprise two or more circumferential layers of wires 7' substantially concentric with the outer tube 6.

In an embodiment, a bituminous compound, a jelly or adhesive fills the interstices between outer tube 6 and armor 7 and between adjacent wires 7' of the armor. This provides protection to the wires 7' and also avoids corrosion during the lifetime of the optical cable.

In the embodiment of FIG. 1, the cable 1 also comprises a bedding layer 9 interposed between the outer tube 6 and the armor 7. The bedding layer can be made of polymeric material such as, e.g., polyethylene (PE), optionally low smoke zero halogen, or polyamide (PA). Its thickness can be comprised between 0.1 mm and 1 mm. The bedding layer acts as an additional protection of the outer tube 6. Also, by selecting a suitable thickness of the bedding layer, the armor size can be tailored to any specific application.

In the embodiment of FIG. 1, the optical cable 1 comprises a jacket 8 as outer sheath. The jacket 8 can be made of a polymeric material, for example high density polyethylene (HDPE), PA, low density polyethylene (LDPE) or linear low density polyethylene (LLDPE). The thickness of the jacket 8 can be comprised between 1.0 mm and 3.0 mm.

The outer diameter of the jacket 8 (and then of the whole cable 1) can range from 6 mm to 12 mm, depending on the fiber count and on the presence of armor and bedding, as shown in the following.

In an embodiment, not illustrated, the cable according to the present disclosure does not comprise any armor and any jacket, the outer tube 6 being the outermost layer of the cable.

Using a single metal tube (second metal tube 4) to collectively enclose all the tight buffered fibers 5 allows protecting them against water seepage while keeping the cable size smaller than e.g. that of a cable wherein multiple steel tubes are used for individually protecting each tight-buffered optical fiber. Further, the outer tube 6 collectively surrounding both the loose tube 2 and tight buffer tube 4 also can allow effectively protecting all the optical fibers 3, 5 against the high pressures (up to 300 bar) typical of underwater and submarine environments.

Further, the tight accommodation of the tight-buffered optical fibers 5 within the tight buffer tube 4, in combination with the adhesive compound 6a fixing the tight buffer tube 4 and/or the loose tube 2 to the inner surface of the outer tube 6, guarantees that the tight buffered fibers 5 are mechanically congruent with the cable structure. This provides a cable with a high sensing accuracy, in particular as far as DAS and DSS sensing is concerned.

The process for manufacturing a distributed sensing cable according to embodiments of the present invention can comprise the following steps: providing a longitudinally folded and welded tube about a bundle of optical fibers, thereby providing the loose tube with the optical fibers loosely arranged within it; providing a longitudinally folded and welded tube about a bundle of tight buffered optical fibers (e.g. 3 tight buffered optical fibers), optionally providing an inner adhesive to fill voids and interstices between the tight buffered optical fibers and the inner surface of the tight buffer tube, and then drawing the tube down onto the fibers, thereby providing the tight buffer tube with the tight buffered fibers tightly arranged within it; providing an adhesive compound on the loose tube and/or the tight buffer tube; joining the tight buffer tube and loose tube to a metal foil; conforming the metal foil around the tight buffer tube and loose tube by folding and drawing the metal foil down onto the loose tube and the tight buffer tube; welding the metal foil thereby providing an outer tube with the loose tube and the tight buffer tube tightly arranged within it; optionally, extruding a bedding layer onto the outer tube; optionally, winding wires around the outer tube (or on the bedding layer, if present) to provide an armor; and optionally, providing a jacket as outermost layer.

In an embodiment, the step iii of providing the adhesive compound is carried out by extruding the adhesive compound. In this case, the adhesive compound can be a hot melt adhesive.

In an embodiment, the step iii of providing the adhesive compound is carried out by spreading the adhesive compound around at least one of said first metal tube and said second metal tube, for example around only one of said first metal tube and said second metal tube. In this case, the adhesive compound can be a silicone adhesive.

In an embodiment, the adhesive compound of step iii is a silicone adhesive which at the application, before hardening, has a viscosity ranging from 10,000 to 30,000 Pas at 25° C.

It shall be noticed that, at step iii, the adhesive compound is not necessarily provided on both the tubes. The Applicant has indeed noticed that it is sufficient to provide an adhesive compound on one of these tubes only. Then, during the next step v, the adhesive compound provided in step iii flows and substantially fills all the voids and interstices between the first and second metal tubes and the inner surface of the outer third tube, thereby providing a firm reciprocal fixing of the tubes and also their fixing to the inner surface of the outer tube 6. The tight buffer tube 4 is thus fixed to the inner surface of the outer tube 6 in a particularly stable way. The tight buffered fibers 5 are then mechanically congruent with the cable structure, as required by DAS and DSS sensing applications.

Herein below, some exemplary cables according to the present disclosure obtained by the Applicant are described.

A first exemplary cable comprised 4 loose fibers and 3 tight buffered fibers, an armor made of 13 wires GS×1.00 mm wires with tensile strength of 170 Kg/mm2 and an HDPE outer sheath with a thickness of 1.5 mm. The outer diameter of the cable was 8 mm, its weight was 0.13 Kg/m, its maximum operational tension was 5 kN, and its ultimate tensile strength was 15 kN.

A second exemplary cable comprised 8 loose fibers and 3 tight buffered fibers, an armor made of 22 wires GS×1.00 mm with tensile strength of 170 Kg/mm2 and an HDPE outer sheath with a thickness of 1.5 mm. The outer diameter of the cable was 6.8 mm, its weight was 0.10 Kg/m, its maximum operational tension was 3 kN, and its ultimate tensile strength was 10 kN.

The invention claimed is:
1. An optical cable for distributed sensing comprising:
a first metal tube with at least two distributed temperature sensing optical fibers loosely arranged therein;
a second metal tube with at least two distributed strain sensing tight buffered optical fibers or distributed acoustic sensing tight buffered optical fibers tightly arranged within an inner surface of the second metal tube; and
a third metal tube having an inner surface and collectively surrounding and operatively contacting the first metal tube and the second metal tube, wherein at least one of the first metal tube and the second metal tube is fixed to the inner surface of the third metal tube by an adhesive compound.

2. The optical cable of claim 1, wherein the first metal tube and second metal tube are made of stainless steel.

3. The optical cable according to claim 1, wherein the third metal tube is made of stainless steel.

4. The optical cable according to according to claim 1, wherein the adhesive compound fills interstices among the first and second metal tubes and the inner surface of the third tube.

5. The optical cable according to claim 1, wherein the adhesive compound is selected from a holt melt adhesive, an epoxy adhesive, a silicone adhesive and mixtures thereof.

6. The optical cable according to claim 5, wherein the adhesive compound, once hardened, has a tensile strength ranging from 1 to 10 N/mm2 as measured according to ISO 37 (2017-11) for silicone or according to ISO 527-2 (1996) for hot melt and epoxy adhesive.

7. The optical cable according to claim 1, wherein an inner adhesive compound fills voids and interstices between the tight buffered optical fibers and the inner surface of the second tube.

8. The optical cable according to claim 1, further comprising an armor in radially outer position with respect to the third metal tube.

9. The optical cable according to claim 1, further comprising an outer sheath.

10. The optical cable according to claim 8, further comprising a bedding layer interposed between the third metal tube and in direct contact thereto, and the armor.

11. The optical cable according to claim 1, wherein the at least two optical fibers loosely arranged in the first metal tube are configured for transmitting data.

12. The optical cable according to claim 8, wherein the armor comprises a plurality of wires helically wound around the third metal tube.

13. The optical cable according to claim 1, wherein the inner surface of the third metal tube is in physical contact with the first metal tube and the second metal tube at most through the adhesive compound.

14. The optical cable according to claim 1, wherein an inner diameter of the third metal tube is substantially equal to a sum of outer diameters of the first metal tube and the second metal tube.

15. The optical cable according to claim 1, wherein the first metal tube, the second metal tube, and the third metal tube are hermetically sealed and waterproof.

16. An optical cable for distributed sensing comprising:
a first metal tube with at least two optical fibers loosely arranged therein, voids of the first metal tube being filled with a lubricating gel;
a second metal tube with at least two tight buffered optical fibers tightly arranged within an inner surface of the second metal tube; and
a third metal tube having an inner surface and collectively surrounding and operatively contacting the first metal tube and the second metal tube, wherein at least one of the first metal tube and the second metal tube is fixed to the inner surface of the third metal tube by an adhesive compound, the adhesive compound being different from the lubricating gel.

17. The optical cable according to claim 16, wherein the first metal tube, the second metal tube, and the third metal tube are waterproof and hermetically sealed.

18. An optical cable for distributed sensing comprising:
a first metal tube with at least two optical fibers loosely arranged therein;
a second metal tube with at least two tight buffered optical fibers tightly arranged within an inner surface of the second metal tube; and
a third metal tube having an inner surface and collectively surrounding, wherein an inner surface of the third metal tube is in physical contact with the first metal tube and the second metal tube at most through an adhesive compound.

19. The optical cable according to claim 18, wherein the adhesive compound fills voids between the first and third metal tubes and voids between the second and third metal tubes.

20. The optical cable according to claim 18, wherein an inner adhesive compound fills voids between the tight buffered optical fibers and the inner surface of the second tube.

* * * * *